United States Patent [19]

Thirode

[11] Patent Number: 4,836,099
[45] Date of Patent: Jun. 6, 1989

[54] DEVICE FOR PICKLING MEAT BY MIXING UNDER VACUUM

[76] Inventor: Pierre Thirode, 80 Boulevard Bourdon, 92200 Neuilly-sur-Seine, France

[21] Appl. No.: 152,217

[22] Filed: Feb. 4, 1988

[30] Foreign Application Priority Data

Feb. 5, 1987 [FR] France .................. 87 01410

[51] Int. Cl.⁴ .................. A23B 4/02; B01F 13/06
[52] U.S. Cl. .................. 99/472; 68/23.1; 68/140; 68/146; 69/30; 99/535; 366/139; 366/233
[58] Field of Search .................. 99/472, 516, 534–536; 51/163.1, 164.1; 366/57–29, 135, 139, 163, 191, 225, 233, 227, 228, 54, 55; 34/92; 69/30; 68/208, 146, 23.1, 140

[56] References Cited

U.S. PATENT DOCUMENTS

| | | | |
|---|---|---|---|
| 2,512,096 | 6/1950 | Endsley | 366/233 X |
| 2,518,636 | 8/1950 | Phillips | 366/233 |
| 3,509,742 | 5/1970 | Bauer | 68/23.1 |
| 3,752,445 | 8/1973 | Nowak | 366/233 |
| 4,118,959 | 10/1978 | Waite | 69/30 |
| 4,214,518 | 7/1980 | Petsche | 99/535 |
| 4,430,003 | 2/1984 | Beattie et al. | 366/233 X |
| 4,517,888 | 5/1985 | Gould | 99/472 |
| 4,520,718 | 6/1985 | Prosenbauer | 99/535 |

Primary Examiner—Timothy F. Simone
Attorney, Agent, or Firm—Hoffman, Wasson, Fallow & Gitler

[57] ABSTRACT

A device for pickling meat by mixing under vacuum comprises a tank (1) suitable for being rotated on its longitudinal axis by drive means (7,8), the tank being provided at one of its ends with an opening (4) for filling/emptying suitable for being closed by a cover by which the vacuum is generated and, if necessary, brine is injected, the tank being mounted on a support frame (11).

The device comprises, near the rear edge of frame (11) for support of the tank, at least one elastic element (16) inserted between frame (11) and the support surface of the device (12) and made in such a way as to be gradually compressed from a rest position corresponding to the empty state of the tank to a filled position, the elastic element(s) gradually returning to their rest position when the tank is emptied.

5 Claims, 1 Drawing Sheet

DEVICE FOR PICKLING MEAT BY MIXING UNDER VACUUM

BACKGROUND OF THE INVENTION

The present invention relates to a device for pickling meat by mixing under vacuum.

The device according to the invention is of the general type described in French patent 75 33343 and comprises a tank that is approximately cylindrical over at least most of its length and is suitable for being rotated in both directions on its longitudinal axis by drive means, the tank being provided, at one of its ends, with an opening for filling/emptying The opening can be sealed through a cover by which the vacuum is generated and, wherein if necessary, through which brine is injected if the meat has not been treated in advance with brine injection.

In the previous patent noted above, means are provided for inclining the longitudinal axis of the tank relative to the horizontal, these means being made to change the inclination of a support frame of the tank relative to the surface on which it is placed.

It is desirable, particularly for increasing the load capacity of the device, that the device be inclined in such a way that the rear part of the tank is lower than the front part provided with the filling/emptying opening.

It is thus desirable to be able to achieve, when the device is completely filled, an angle of inclination of the tank relative to the horizontal of up to 40°.

This steep incline, favorable to filling, proves, however be completely inappropriate to allow complete emptying of the meat from the device after the pickling-/mixing operation.

In this type of device, removal of the processed meat is done through the opening of the tank by simple rotation of the tank in the direction opposite to its direction of rotation during the mixing operation, this removal being promoted by guiding plates attached to the inside wall of the tank.

It is noted that with an angle of inclination of the tank of the size of the one mentioned above, a significant amount of meat does not automatically leave the tank, requiring intervention by service personnel.

The present invention is aimed at making a device that avoids in particular this type of drawback and further offers an increased quality and operating reliability.

SUMMARY OF THE INVENTION

The device according to the invention is characterized in that it comprises, near the rear edge of the support frame of the tank, at least one elastic element inserted between the frame and the support surface of the device, the element being designed to be gradually compressed from a rest position corresponding to the empty state of the tank in which the longitudinal axis of the latter preferably forms an angle of less than 5° with the horizontal to a filled position in which the longitudinal axis of the tank forms, with the horizontal, an angle between about 10° and about 40° and preferably between about 10° and about 20°, the elastic element(s) returning gradually to their rest position during emptying of the tank.

In an advantageous embodiment the elastic elements are helical compression springs, preferably two in number, spaced on both sides of the longitudinal axis of the tank and inserted between a flange offset toward the top of the support frame near its rear end and the receiving surface of the frame, the flange extending approximately at the level of a rear bearing for mounting the axis of rotation of the tank.

Such an elastic mounting of the tank and of its support frame offers the additional advantage of assuring a damping of the shocks caused by the movement of the pieces of meat against the inside wall of the tank during each rotation of the latter, guaranteeing less wear of the bearing and the drive means and thus providing a greater operating reliability.

Thanks to the characteristics of the present invention, an automatic adaptation of the inclination of the tank as a function of the feeding of meat introduced results, allowing an optimized function as a whole, even during the phases of filling, mixing under vacuum and emptying, each phase taken individually likewise being optimized.

BRIEF DESCRIPTION OF THE DRAWINGS

With the aim of making the invention better understood, an embodiment will be described by way of example and in a nonlimiting way by referring to the attached drawing in which.

DESCRIPTION OF THE PREFERRED EMBODIMENT

Figure 2:
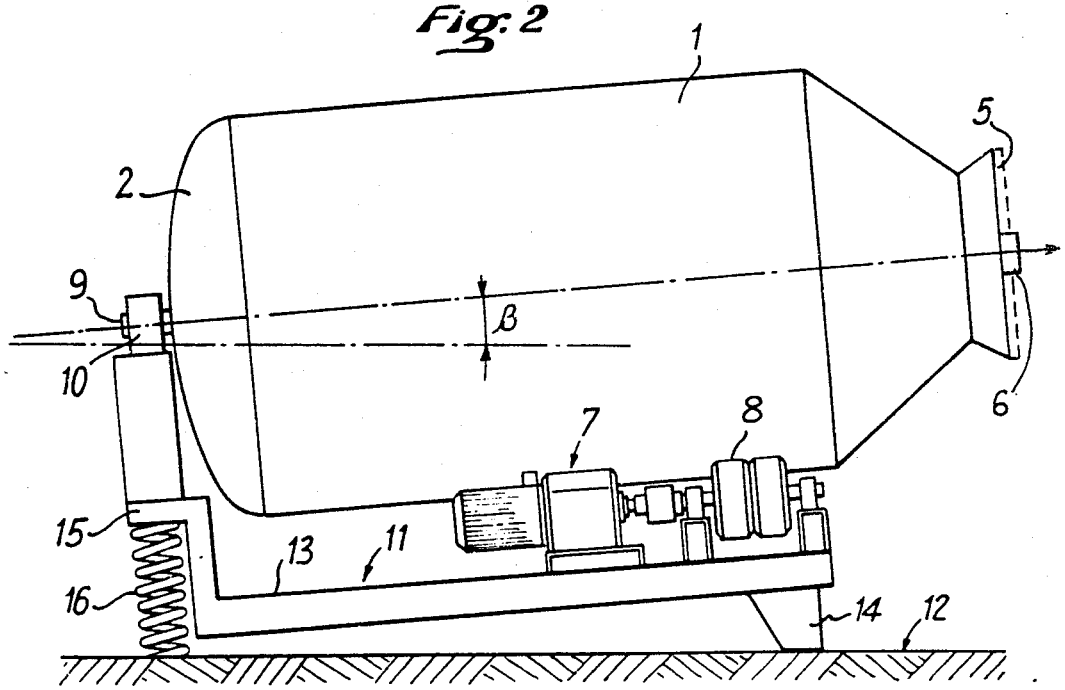
FIG. 2 is likewise a diagrammatic view in elevation of the device according to the invention in the operating position, the tank being filled.

The device according to the invention is of the general type described in French patent 75 33343 and comprises a tank 1 that is cylindrical over most of its length and terminates at its rear part in a convex end 2 and in its front part at a filling and emptying zone with biconical shape 3 whose end opening 4 is suitable for being closed by a door shown diagrammatically as 5 in FIG. 2. Door 5, which can be of the structure of the one described in French patent 75 33343, comprises a turning joint shown diagrammatically as 6 through which the tank is placed under vacuum and the brine is admitted, as this is explained in the previous document, the arrow illustrated in FIG. 2 showing diagrammatically the connection to the circuit, not shown, provided for this purpose.

Tank 1 is suitable for being driven in rotation around its longitudinal axis by a drive unit comprising a geared motor group 7 suitable for driving in both directions, as desired, friction drive wheels 8 in contact with the cylindrical outside wall of the tank. The tank likewise comprises at its rear end a shaft 9 rotating in a bearing 10 mounted at the rear part of a frame 11 supporting the tank and allowing the mounting of the latter on a receiving surface 12.

More specifically, frame 11 comprises essentially a main supporting surface 13 of a length corresponding approximately to the length of the cylindrical part of the tank and supporting gear motor group 7 and drive wheels 8. Supporting surface 13 comprises likewise at its front part support feet 14 and is extended at its rear part by a flange 15 which is offset upward and plumb within which is located bearing 10 for supporting the axis of the tank.

According to the invention, between support frame 11 and receiving surface 12 and, more specifically in the embodiment shown, between flange 15 and support surface 12, there are two compression springs 16, preferably two in number.

Figure 1:
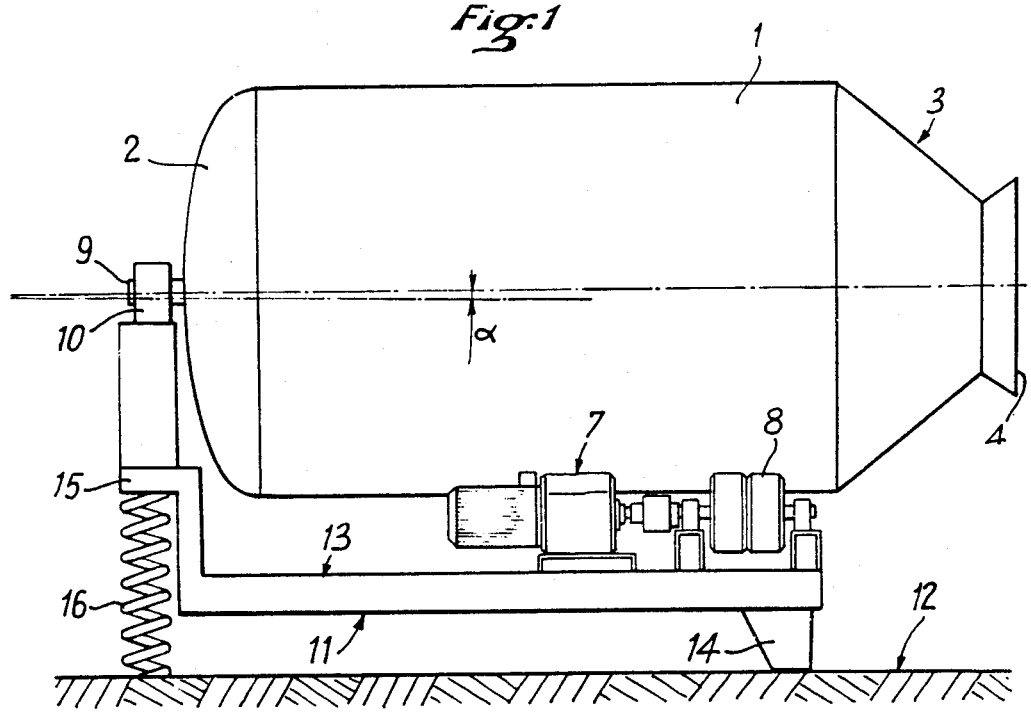
FIG. 1 is a diagrammatic view in elevation of a device according to the invention in a rest position with an empty tank.

These springs 16 are of a size such that in their rest position, illustrated in FIG. 1, the longitudinal axis of the tank is approximately horizontal or slightly inclined relative to the horizontal, for example by an angle $\alpha$ of 5°.

As the tank is filled with pieces of meat, then with brine, tank 1 inclines toward the rear, compressing springs 16 to a maximum filled position illustrated in FIG. 2 where springs 16 are completely compressed and the tank forms an angle $\beta$ with the horizontal of 15°.

When, starting from this position, the pickled meat is emptied from the tank, by rotation of the latter in the direction opposite to the direction of rotation during the mixing under vacuum, springs 16 gradually slacken, as the weight of the filled tank decreases, until they return to the position of FIG. 1 where all the pickled meat is easily emptied automatically without any external intervention.

Although helical compression springs have been illustrated in the drawing, according to the invention other types of comparable elastic elements that assure compression properties during filling and then emptying can be envisioned, for example, units of elastomer blocks or the like.

Finally, although the invention has been described in connection with a particular embodiment, it is evident that it is in now way limiting and many variants and modifications could be made to it without going beyond its framework or its spirit.

I claim:

1. A device for pickling meat by mixing under vacuum, comprising a tank that is approximately cylindrical over at least a main part of its length, drive means for rotating said tank in either direction around its longitudinal axis, said tank having an opening at one of its ends for filling and emptying purposes, a cover associated with the opening through which evacuation of the tank and, if necessary, injection of brine may be done, a support frame upon which the tank is mounted for rotation, and means for changing the inclination of said frame relative to a supporting surface on which it rests, so as to change the inclination of said longitudinal axis, the improvement wherein said inclination changing means comprises at least one elastic element inserted between said frame and said support surface at one end of the frame, and disposed so as to be gradually compressed by the weight of the tank from the first position when the tank is empty to a second position when the tank is full, whereby said elastic elements return gradually to said first position as the tank is emptied.

2. The invention of claim 1, wherein the elastic element is chosen so that the longitudinal axis of the tank forms an angle of less than about 5° with the horizontal when the tank is empty and an angle between about 10° and about 40° when the tank is full.

3. The invention of claim 1, wherein each elastic element is a helical compression spring.

4. The invention of claim 3, comprising two of said springs, one on either side of said longitudinal axis.

5. The invention of claim 3, wherein said tank is supported for rotation by a bearing disposed around said axis at the end of the tank opposite said opening, and said support frame has an upwardly offset flange disposed substantially below said bearing, each of said springs being inserted between said flange and said support surface.

* * * * *